(12) United States Patent
Schenk

(10) Patent No.: US 6,930,567 B2
(45) Date of Patent: Aug. 16, 2005

(54) TRANSMISSION SYSTEM

(75) Inventor: Heinrich Schenk, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/629,310

(22) Filed: Jul. 28, 2003

(65) Prior Publication Data

US 2004/0095203 A1 May 20, 2004

(30) Foreign Application Priority Data

Jul. 29, 2002 (DE) .......................... 102 34 479

(51) Int. Cl.⁷ .............................. H03H 7/24; H01P 1/22
(52) U.S. Cl. ..................................... 333/81 R; 333/18
(58) Field of Search ................... 333/17.3, 18, 32, 333/81 R

(56) References Cited

U.S. PATENT DOCUMENTS

| | | | | |
|---|---|---|---|---|
| 3,150,326 A | * | 9/1964 | Witt ........................... | 330/284 |
| 3,601,718 A | * | 8/1971 | Arnesen .................... | 333/81 R |
| 3,995,237 A | * | 11/1976 | Brunner ..................... | 333/17.3 |
| 4,057,771 A | * | 11/1977 | Schmidt ..................... | 333/168 |
| 4,942,375 A | * | 7/1990 | Petitjean et al. .......... | 333/81 R |

FOREIGN PATENT DOCUMENTS

| | | | | |
|---|---|---|---|---|
| DE | 44 14 224 A1 | 10/1995 | ............ | H04B/3/14 |
| GB | 1159777 | 7/1999 | ............ | H04B/3/02 |

OTHER PUBLICATIONS

F. Vilbig, "Lehrbuch Der Hochfrequenztechnik," Akademische Verlagsgesellschaft Becker & Erler, Leipzig, Seiten 264 bis 270 (1942).

* cited by examiner

*Primary Examiner*—Dean Takaoka
(74) *Attorney, Agent, or Firm*—Fish & Richardson P.C.

(57) ABSTRACT

The present invention provides a transmission system having a signal source which has an internal resistance, having a signal transmission line (102), one end of which is connected to the signal source, and having a terminating resistance which is connected to another end of the signal transmission line (102), the internal resistance of the signal source and the terminating resistance being complex and being chosen such that frequency-dependent signal attenuation in the transmission system is reduced in a frequency range which contains the frequencies of signals which are produced by the signal source.

11 Claims, 3 Drawing Sheets

TRANSMISSION SYSTEM

RELATED APPLICATION

Pursuant to 35 USC § 119 this application claims the benefit of German Patent Application No. 102 34 479.5, filed on Jul. 29, 2002, the contents of which are herein incorporated by reference.

BACKGROUND

Field of Invention

The present invention relates to a transmission system and, in particular, to a transmission system having a subscriber line, such as an ISDN subscriber line.

FIG. 1 shows an ordinary transmission system or a circuit arrangement in which a signal transmission line 102, such as a two-wire ISDN subscriber line, is respectively isolated from a transmitter and from a receiver by means of a transformer 104, 106. The transformers 104 and 106 and the signal transmission line 102 form a four-terminal transmission network, which will be referred to several times below. The transmitter has an ideal voltage source 108 and an internal resistance ($R_0$) 110. The ideal voltage source 108 with the source voltage $U_0$ is connected to the transformer 104 via the internal resistance 110. At the reception end, the voltage $U_E$ is tapped off on a terminating resistance ($R_0$) 112 and is processed further in the receiver. The internal resistance 110 of the ideal voltage source 108 is normally equal to the terminating resistance 112.

The insertion loss of the four-terminal transmission network is defined as the ratio of the voltage $U_E$ across the terminating resistance 112 to the voltage across the terminating resistance 112 in the absence of a four-terminal transmission network. The voltage across the terminating resistance 112 without a four-terminal transmission network is equal to half the source voltage $U_0$. The following equation is thus obtained for the insertion loss:

$$H(f) = \frac{U_E(f)}{U_0(f)/2}$$

FIG. 2 shows an example of the insertion loss of a four-terminal transmission network as shown in FIG. 1 when an ISDN access method is used. In this case, the ISDN signal transmission line has a length of 6.5 km and a diameter of 0.4 mm. The primary inductance of the transformers 104 and 106 has a value of 14 mH, and the terminating resistance 110 or the internal resistance 108 of the transmitter has a value of 135 Ω (ohms). By way of comparison, FIG. 6 also shows the pure line attenuation of the signal transmission line 102. It can be seen that the curve for the insertion loss differs significantly from the curve for the line attenuation only at low frequencies. The reason for this is that the characteristic impedance of the signal transmission line 102 differs relatively greatly from the terminating resistance 112 in this frequency range.

Subscriber access methods involve the use of a duplex-channel method with echo cancellation and pulse amplitude modulation (PAM) for speeds of up to 2.5 Mbit/s. The duplex-channel method is an electrical duplex transmission method for two-wire lines, in which the information in both directions of transmission is transmitted at the same frequency and in the same time slot. The purpose of echo cancellation is to render that component of the information from the transmitter which reaches the receiver inactive. The methods are described in more detail and specified, by way of example, in ANSI T1.601-1998 Integration Services Digital Network (ISDN)—Basic Access Interface for Use on Metallic Loops for Application on the Network Side of the NT (Layer 1 Specification), for the ISDN access method, and in ITU-T Q.4/15, "G.shdsl.bis: Draft Recommendation Text", CS-R15, March 2002 for the SDSL method. On the basis of the pulse amplitude modulation, a transmission system involves almost complete use of the lower frequency range shown in FIG. 2, with limiting being provided merely by the transformers 104 and 106 (FIG. 1) used in the transmission system, the cutoff frequency of said transformers being dependent on the primary inductance and on the cutoff frequency of the high-pass filter used in the receiver. Since the line attenuation (shown in FIG. 2) of the signal transmission line 102 rises continuously with frequency, pulse amplitude modulation allows particularly good use to be made of the available bandwidth. With a given interference environment and a particular bit rate, however, the range which can be achieved for signal transmission is limited by the line attenuation. The range of signal transmission can then be increased only by reducing the bit rate or by using a repeater.

In the case of the ISDN access method, the range of signal transmission is normally increased, by way of example, by using a more efficient transmission method, e.g. SDSL, with corresponding coding, such as trellis coding. With an SDSL method, upon reaching the maximum range, a further increase is no longer possible, however, since more efficient transmission methods are currently still not available.

SUMMARY

The object of the present invention is to provide a transmission system which permits a greater range for signal transmission.

The idea underlying the invention is to reduce the signal attenuation arising in a transmission system from the signal source or the transmitter to the receiver in a frequency range in which the signals from the transmitter are transmitted via the transmission system by connecting a complex resistance to the signal transmission line or to the four-terminal transmission network.

The invention provides a transmission system having a signal source which has an internal resistance, having a signal transmission line, one end of which is connected to the signal source, and having a terminating resistance which is connected to another end of the signal transmission line, the internal resistance of the signal source and the terminating resistance being complex and being chosen such that frequency-dependent signal attenuation in the transmission system is reduced in a frequency range which contains the frequencies of signals which are produced by the signal source.

In line with one preferred development, the frequencies of the signals produced by the signal source are in a lower frequency range.

In line with another preferred development, the internal resistance of the signal source and the terminating resistance have a complex resistance which comprises a series circuit comprising a real resistance and an inductance or comprises a series circuit comprising a real resistance and a parallel circuit comprising an inductance and a capacitance.

One advantage of this development is that a very simple change or adjustment to the transmission system allows the range of signal transmission to be increased without needing to reduce the bit rate for signal transmission.

In line with another preferred development, the internal resistance of the signal source and the terminating resistance are chosen independently of the transmission bandwidth of the signal transmission line and/or the symbol rate of the transmitted signals.

In line with another preferred development, the signal transmission line has a great length and/or high signal attenuation.

In line with another preferred development, the internal resistance of the signal source and the terminating resistance can be set in the transmission system on the basis of the frequencies and/or the symbol rate of the transmitted signals.

In line with another preferred development, the transmission system also has transformers which couple the signal source and the terminating resistance to the signal transmission line.

In line with another preferred development, the transmission system is an ISDN transmission system, and the lower frequency range contains frequencies of below 40 kHz.

In line with another preferred development, the transmission system is an ISDN transmission system, and the real resistance has a value of 135 Ω and the inductance has a value of 2.7 mH.

In line with another preferred development, the signal transmission line is an ISDN signal transmission line which has a length of between 6 and 7 km.

Preferred exemplary embodiments of the present invention are explained in more detail below with reference to the appended drawings, in which:

DETAILED DESCRIPTION

Figure 3A:
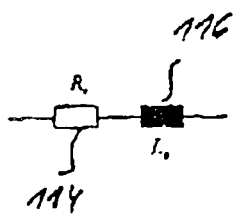
FIGS. 3A and 3B show complex resistances for connection to a four-terminal transmission network.
Figure 3B:
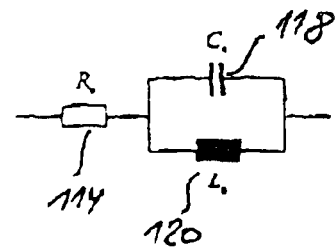

The invention involves the internal resistance 110 (FIG. 1) of the transmitter and the terminating resistance 112 of the receiver being replaced by a complex resistance. This allows the signal attenuation of the transmission system or the insertion loss of the signal transmission line 102 or of the four-terminal transmission network to be altered and, with suitable dimensioning of the complex resistance, reduced in a particular frequency range. FIGS. 3A and 3B show two alternatives for complex resistances which are used in the invention by way of preference instead of a real internal resistance and terminating resistance for connecting up the four-terminal transmission network. The complex resistance, which is shown in FIG. 3A, has a series circuit comprising a real resistance ($R_0$) 114 and an inductance ($L_0$) 116, and the complex resistance, which is shown in FIG. 3B, has a series circuit comprising a real resistance ($R_0$) 114 and a parallel circuit comprising a capacitance ($C_0$) 118 and an inductance ($L_0$) 120.

Figure 1:
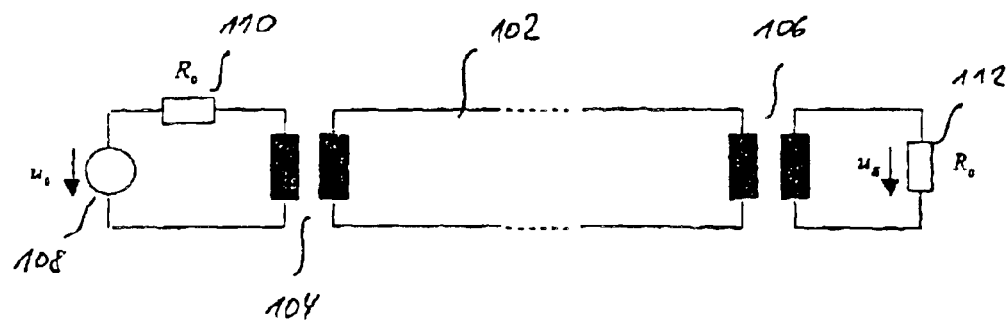
FIG. 1 shows an ordinary transmission system.
Figure 2:
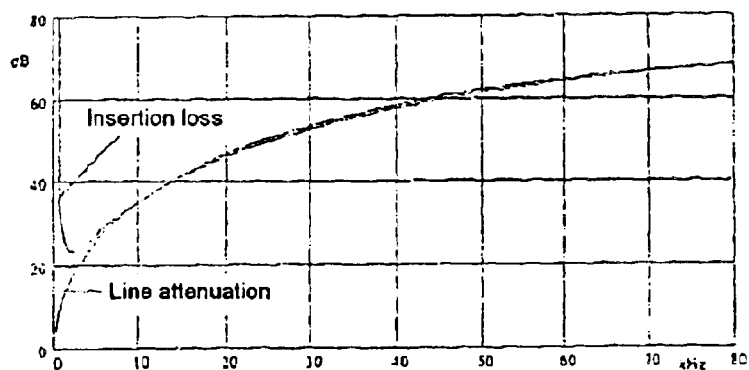
FIG. 2 shows the insertion loss and the line attenuation in a four-terminal transmission network.
Figure 4:
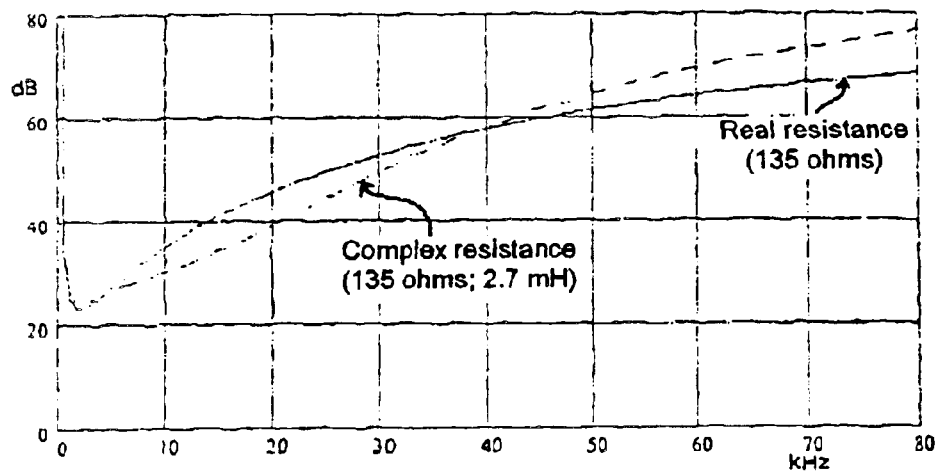
FIG. 4 shows insertion losses in a four-terminal transmission network in the case of real or complex circuitry.

FIG. 4 shows the insertion losses in a four-terminal transmission network when, in a first case, a real internal resistance and a real terminating resistance as shown in FIG. 1 are used and, in a second case, a complex internal resistance and a complex terminating resistance as shown in FIG. 3A are used. In this case, the complex internal resistance and the complex terminating resistance are identical, and the real resistance 114 or effective resistance of each complex resistance has a value of 135 Ω and the inductance 116 of each complex resistance has a value of 2.7 mH. The signal transmission line has a length of 6.5 km, and the value of the primary inductance of the transformer is 14 mH. FIG. 4 shows that, below 40 kHz, the insertion loss with a complex internal resistance and a complex terminating resistance is reduced as compared with the insertion loss with a real internal resistance and a real terminating resistance. For a transmission system with a symbol rate of 80 kbauds, for example, the Nyquist frequency is 40 kHz. This is the frequency range which is used for data transmission and for which lower attenuation of the transmitted signals is obtained with complex circuitry in this case.

Figure 5:
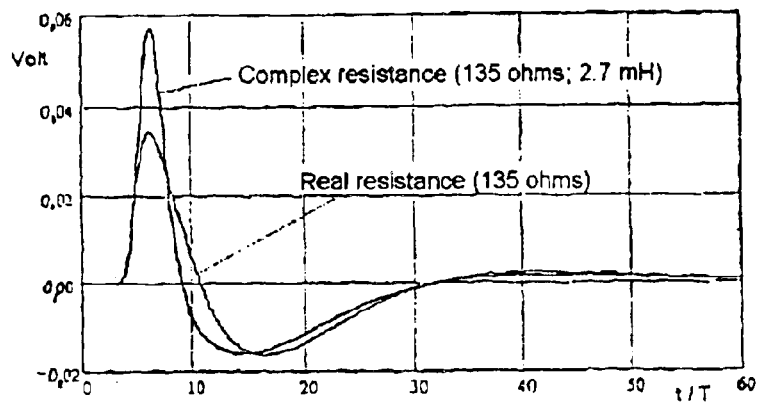
FIG. 5 shows the pulse responses of four-terminal transmission networks with real or complex circuitry and the same length for the signal transmission lines.

FIG. 5 shows the pulse responses at the output of two ISDN four-terminal transmission networks, one of which has real circuitry and the other of which has complex circuitry, as a reaction to a Dirac pulse at the input of each four-terminal transmission network. The ISDN four-terminal transmission networks each have an ISDN signal transmission line with a length of 6.5 km and a diameter of 0.4 mm. The primary inductance of the transformers 104 and 106 has a value of 14 mH, and the ISDN transmission system has a symbol rate of 80 kbauds. The level of control for the transmission signal produced by the signal source is chosen such that the same effective values of the transmission signal are respectively obtained at the inputs of the four-terminal transmission networks both for the case with a purely real internal resistance and terminating resistance and with a complex internal resistance and terminating resistance. From FIG. 5, the gain in signal-to-noise ratio can be taken approximately from the ratio of the peak values of the pulse responses. In this case, this gain is approximately 4.4 dB. As shown below, the evaluation of such pulse responses allows a statement indicating an increase in range as a result of a four-terminal transmission network having complex resistances connected to it.

Figure 6:
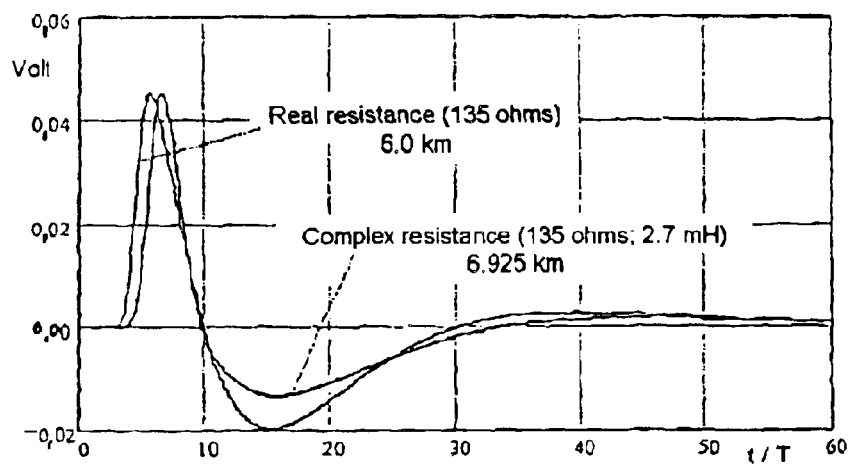
FIG. 6 shows pulse responses of four-terminal transmission networks with real or complex circuitry and different lengths for the signal transmission lines.

FIG. 6 shows the pulse responses from two four-terminal transmission networks, one of which has real circuitry and the other of which has complex circuitry, and which have various lengths for their respective signal transmission line. In ISDN transmission systems with a real internal resistance and a real terminating resistance and with a diameter of the signal transmission line of 0.4 mm, the maximum range is approximately 6 km. Hence, FIG. 4 shows firstly the pulse response in the receiver for an ISDN transmission system with a real internal resistance and a real terminating resistance (135 Ω) and with a length of the signal transmission line of 6 km, and secondly shows the pulse response in the receiver for an ISDN transmission system with a complex internal resistance and terminating resistance (135 Ω; 2.7 mH) by way of comparison. As can be seen, the maximum values of the pulse responses are the same in both cases shown, so that approximately the same signal-to-noise ratio is obtained. Unlike the ISDN transmission system with real circuitry, however, the ISDN transmission system with complex circuitry has a signal transmission line with a length of 6.925 km. This can be used to derive an increase in range for the signal transmission with complex resistances which, in this example, is approximately 925 m, corresponding to a percentage increase in range of approximately 15%. FIG. 6 also shows that, in total, the distortions in the pulse response in the case with complex circuitry are smaller, despite the increase in the length of the signal transmission line, than in the case with real circuitry. With optimum dimensioning of the complex resistance taking into account the distortions which arise and the downstream equalizer used, it is even possible to achieve a greater increase in range.

The use of complex resistances is particularly suitable for the application with correspondingly long lines. In the case of the described example of an ISDN transmission system, the line length should be at least approximately 3 km, however. With shorter lines, there is normally an increasing occurrence of distortions which can no longer be compensated for by a downstream equalizer. The use of complex resistances can be applied not just to ISDN transmission systems but preferably to all transmission systems with relatively long lines or high levels of line attenuation. In this case, the possible increase in range is all the greater the smaller the frequency bandwidth used.

Since the use of complex resistances which is described here reduces the signal attenuation or the insertion loss of a four-terminal transmission network below a particular frequency and increases it above this frequency, for example, it is possible to increase the range of the signal transmission in the lower frequency range without needing to reduce the bit rate. The dimensioning of the complex resistance is aligned generally with the desired transmission frequency range and with the bandwidth used and hence with the symbol rate for a given transmission system. The invention is advantageous particularly when a range is required which is greater than the maximum range normally possible for a particular bit rate and there is no intention to reduce the symbol rate (bandwidth) or bit rate (e.g. ISDN). In these cases, it is possible to dispense with the use of a repeater in particular areas of a range. The invention can therefore be used to increase the range of a particular transmission system with only little implementation complexity.

Although the present invention has been described above with reference to a preferred exemplary embodiment, it is not limited thereto but can be modified in a wide variety of ways.

The invention can be used with any type of transmission system whose transmission characteristic has a frequency-dependent or complex response which can be influenced by means of suitable circuitry. By way of example, the invention can be used not just for conventional two-wire lines but also for other lines, such as shielded lines, e.g. coaxial cables.

The complex circuitry for a four-terminal transmission network can be selected automatically on the basis of the respective transmission frequency range at present, the bandwidth of the transmitted signals etc.

What is claimed is:

1. A transmission system comprising:

a signal source for generating signals having frequency components in a selected frequency range, the signal source having a complex internal resistance;

a signal transmission line having a first end connected to the signal source;

a complex terminating resistance connected to a second end of the signal transmission line;

wherein at least one of the internal resistance and terminating resistance is selected to reduce frequency-dependent signal attenuation in the selected frequency range, wherein the selected frequency range includes frequencies below 40 kHz.

2. The transmission system of claim 1, wherein the signal transmission line comprises an ISDN transmission line having a length between 6 and 7 kilometers.

3. The transmission system of claim 1, wherein at least one of the internal resistance and terminating resistance comprises a real resistance in series with an inductance.

4. The transmission system of claim 1, wherein at least one of the internal resistance and terminating resistance comprises a series circuit comprising a real resistance and a parallel circuit comprising an inductance and a capacitance.

5. The transmission system of claim 1, wherein at least one of the internal resistance and the terminating resistance is selected independently of a bandwidth of the signal transmission line.

6. The transmission system of claim 1, wherein at least one of the internal resistance and the terminating resistance is selected independently of a symbol transmission rate of the transmission system.

7. The transmission system of claim 1, wherein at least one of the internal resistance and the terminating resistance is selected on the basis of a bandwidth of the signal transmission line.

8. The transmission system of claim 1, wherein at least one of the internal resistance and the terminating resistance is selected on the basis of a symbol transmission rate of the transmission system.

9. The transmission system of claim 1, further comprising a first transformer disposed to couple the signal source to the transmission line and a second transformer disposed to couple the transmission line to the terminating resistance.

10. An ISDN transmission system comprising a data transmission system as recited in claim 1.

11. The ISDN transmission system of claim 1, wherein at least one of the internal resistance and terminating resistance has a real resistance of 135 ohms and an inductance of 2.7 millihenries.

* * * * *